United States Patent
Ibasco et al.

(10) Patent No.: US 9,521,230 B2
(45) Date of Patent: Dec. 13, 2016

(54) SYSTEM AND METHOD FOR DISPLAYING AN IDENTIFIER OF A SOURCE ON A RECIPIENT DEVICE

(75) Inventors: Alex D. Ibasco, Paranaque (PH); Eduardo Ramon G. Joson, Quezon (PH); William Emmanuel S. Yu, Pasay (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 172 days.

(21) Appl. No.: 14/117,366

(22) PCT Filed: May 9, 2012

(86) PCT No.: PCT/SG2012/000163
§ 371 (c)(1),
(2), (4) Date: Nov. 12, 2013

(87) PCT Pub. No.: WO2012/154128
PCT Pub. Date: Nov. 15, 2012

(65) Prior Publication Data
US 2014/0357245 A1  Dec. 4, 2014

(30) Foreign Application Priority Data

May 12, 2011 (SG) .............................. 201103396-6

(51) Int. Cl.
*H04M 1/57* (2006.01)
*H04M 3/42* (2006.01)

(52) U.S. Cl.
CPC .............. *H04M 1/57* (2013.01); *H04M 1/575* (2013.01); *H04M 3/42042* (2013.01); *H04M 2207/182* (2013.01)

(58) Field of Classification Search
None
See application file for complete search history.

(56) References Cited

U.S. PATENT DOCUMENTS 5,590,184 A  12/1996 London
6,662,014 B1  12/2003 Walsh
(Continued)

FOREIGN PATENT DOCUMENTS

CN  101729704  6/2010
JP  2004240624  8/2004
(Continued)

OTHER PUBLICATIONS

"International Search Report and Written Opinion dated Jul. 10, 2012," International Application No. PCT/SG2012/000163, 10 pages.

*Primary Examiner* — Daniel Lai
(74) *Attorney, Agent, or Firm* — Nixon Peabody LLP (57) ABSTRACT

A system and method for displaying an identifier of a source on a recipient device in communication with the source, the system comprising an association database defining at least one source associated with the recipient device; and a processing manager arranged to process communications from the source to the recipient device and arranged to access the association database to determine if the source is associated with the recipient device and, if so, to display an established identifier of the source, otherwise to determine the privacy settings of the source and display a further identifier on the recipient device in accordance with the determined privacy settings is disclosed.

34 Claims, 6 Drawing Sheets

(56) References Cited

U.S. PATENT DOCUMENTS

| | | | |
|---|---|---|---|
| 2007/0140267 A1* | 6/2007 | Yang | H04L 29/06027 370/401 |
| 2007/0165821 A1* | 7/2007 | Altberg | H04L 29/06027 379/210.02 |
| 2008/0152097 A1 | 6/2008 | Kent | |
| 2009/0136013 A1 | 5/2009 | Kuykendall et al. | |
| 2009/0186629 A1 | 7/2009 | Soelberg et al. | |
| 2010/0002686 A1 | 1/2010 | Rosenberg et al. | |
| 2010/0190479 A1* | 7/2010 | Scott | G06F 17/289 455/414.1 |
| 2011/0117878 A1* | 5/2011 | Barash | G08B 21/0211 455/404.2 |
| 2012/0185547 A1* | 7/2012 | Hugg | H04L 51/20 709/206 |

FOREIGN PATENT DOCUMENTS

| | | |
|---|---|---|
| JP | 2005086791 | 3/2005 |
| JP | 2005509375 | 4/2005 |
| JP | 2005130009 | 5/2005 |
| JP | 2005197827 | 7/2005 |
| JP | 2006279129 | 10/2006 |
| JP | 2007123959 | 5/2007 |
| JP | 2008172619 | 7/2008 |
| JP | 2009177719 | 8/2009 |
| KR | 10-2009-0019606 | 2/2009 |
| WO | 03008992 A2 | 1/2003 |
| WO | 2010105663 | 9/2010 |

\* cited by examiner

SYSTEM AND METHOD FOR DISPLAYING AN IDENTIFIER OF A SOURCE ON A RECIPIENT DEVICE

CROSS-REFERENCE TO RELATED APPLICATIONS

The present application is a U.S. National Stage entry under 35 U.S.C. §371 of International Application No. PCT/SG2012/000163, filed on 9 May 2012, which claims benefit of Singapore Application No. 201103396-6, filed on 12 May 2011, which is hereby incorporated by reference in its entirety.

FIELD OF THE INVENTION

The present invention relates to a system and method of displaying an identifier of a source on a recipient device. The invention is particularly suited but is not exclusive to the display of an identifier, such as the caller ID of a caller on a recipient mobile phone.

BACKGROUND ART

The following discussion of the background to the invention is intended to facilitate an understanding of the present invention only. It should be appreciated that the discussion is not an acknowledgement or admission that any of the material referred to was published, known or is part of the common general knowledge of the person skilled in the art in any jurisdiction as of the priority date of the invention.

Public switched telephone networks (PSTN) numbers are typically assigned to the physical line and that number remains unchanged. Similarly, mobile phone numbers are assigned to the subscriber identity module (SIM).

One known way of assigning PSTN numbers and mobile phone numbers is based on the E.164 ITU-T recommendation which defines the format of telephone numbers and the international public telecommunication numbering plan used in PSTN and other data networks.

There is, however, a perceived need for a service that could provide dynamic and temporary allocation of phone numbers which will allow the creation of different identifiers for the source caller to different recipients.

Although users of mobile phones may utilize caller ID and call lists, these features are merely informational and require the user to actively update and associate callers to a contact, such as by saving each caller's number in a contact list or electronic phonebook. Under the caller ID system, there is no active links or automatic association between the caller and the person being called.

A known method of associating between a caller and the person being called is to create a 'social connection' or social link. However such systems are limited and restricted to callers and persons receiving the calls within the same network due to trust/security issues.

Further, while it is possible to switch off the caller ID option or mask a phone number, many current phones and phone systems do not support number masking due to possible abuse by end users.

The present invention seeks to alleviate or reduce the above mentioned drawbacks.

SUMMARY OF THE INVENTION

In accordance with a first aspect of the present invention there is provided a system for displaying an identifier of a source on a recipient device in communication with the source, the system comprising an association database defining a list of at least one source associated with the recipient device; and a processing manager arranged to process communications from the source to the recipient device and arranged to access the association database to determine if the source is associated with the recipient device and, if so, to display an established identifier of the source, otherwise to determine the privacy settings of the source and display a further identifier on the recipient device in accordance with the determined privacy settings.

Preferably the processing manager is integrated with the source and/or recipient device.

Preferably the system further comprises a Location Based Service (LBS) to determine the location of the source. Advantageously the LBS is further configured to determine the number of registered users of the LBS nearest to the location of the source.

Preferably the recipient device is a mobile device. Advantageously the recipient device comprises a system log for determining whether the source is watchlisted or blacklisted. Advantageously, upon determining that the source is watchlisted or blacklisted, the communication initiated by the source is terminated or an alert is triggered thereafter terminating the communication respectively.

Preferably the processing manager is adapted to be in data communication with an external gateway for routing the communications from the source to the recipient device if it is determined that the source and recipient devices are not within the same communication network.

Preferably the processing manager is arranged to access a network address book to determine if the source is associated with the recipient device.

Preferably the privacy settings of the source are determined based on whether the source is publicly listed, unlisted or has its identifier masked.

In accordance with a second aspect of the present invention there is provided a method for displaying an identifier of a source on a recipient device in communication with the source comprising the following steps: a. defining a list of at least one source associated with the recipient device; b. processing communications from the source to the recipient device; and c. determining from the list if the source is associated with the recipient device; and, if so, display an established identifier of the source, otherwise to determine the privacy settings of the source and display a further identifier on the recipient device in accordance with the determined privacy settings.

Preferably the step of determining the privacy settings of the source includes determining if the source is unlisted or has its identifier masked.

Preferably if it is determined that the source and recipient device are within the same communication network, the method further includes the step of checking if the source is blacklisted or watchlisted within the communication network.

Preferably if the source is not blacklisted and watchlisted, privacy settings of the recipient device is checked to determine if the identifier of the source may be displayed on the recipient device.

Preferably if the source is watchlisted an alert is triggered and the communication from the source to the recipient device is terminated.

Preferably if the source is blacklisted, the communication from the source to the recipient device is terminated immediately.

Preferably, the method including a step of establishing the route between the source and recipient device, wherein the route establishment step includes checking the identifier attribute of the source to determine how the identifier is derived. Advantageously, the step of checking the identifier attribute includes determining if the identifier was forwarded, downloaded or manually inputted to the source.

Preferably the method includes the step of determining if the source and recipient device are within the same communication network, and routing communications from the source if it is determined that the source and recipient devices are not within the same communication network.

Preferably the step of determining whether an association exists between the source and recipient device includes accessing a network address book.

In accordance with a third aspect of the present invention there is provided a recipient device comprising a processing manager arranged to process communications from a source to the recipient device; the processing manager arranged to access an association database to determine if the source is associated with the recipient device, the association database defines a list of at least one source associated with the recipient device; wherein upon determining that the source is associated with the recipient device, display an established identifier of the source, and upon determining that the source is not associated with the recipient device, to determine the privacy settings of the source and display a further identifier on the recipient device in accordance with the determined privacy settings.

BRIEF DESCRIPTION OF THE DRAWINGS

The present invention will now be described, by way of illustrative example only, with reference to the accompanying drawings, of which.

DESCRIPTION OF EMBODIMENTS OF THE INVENTION

Figure 1:
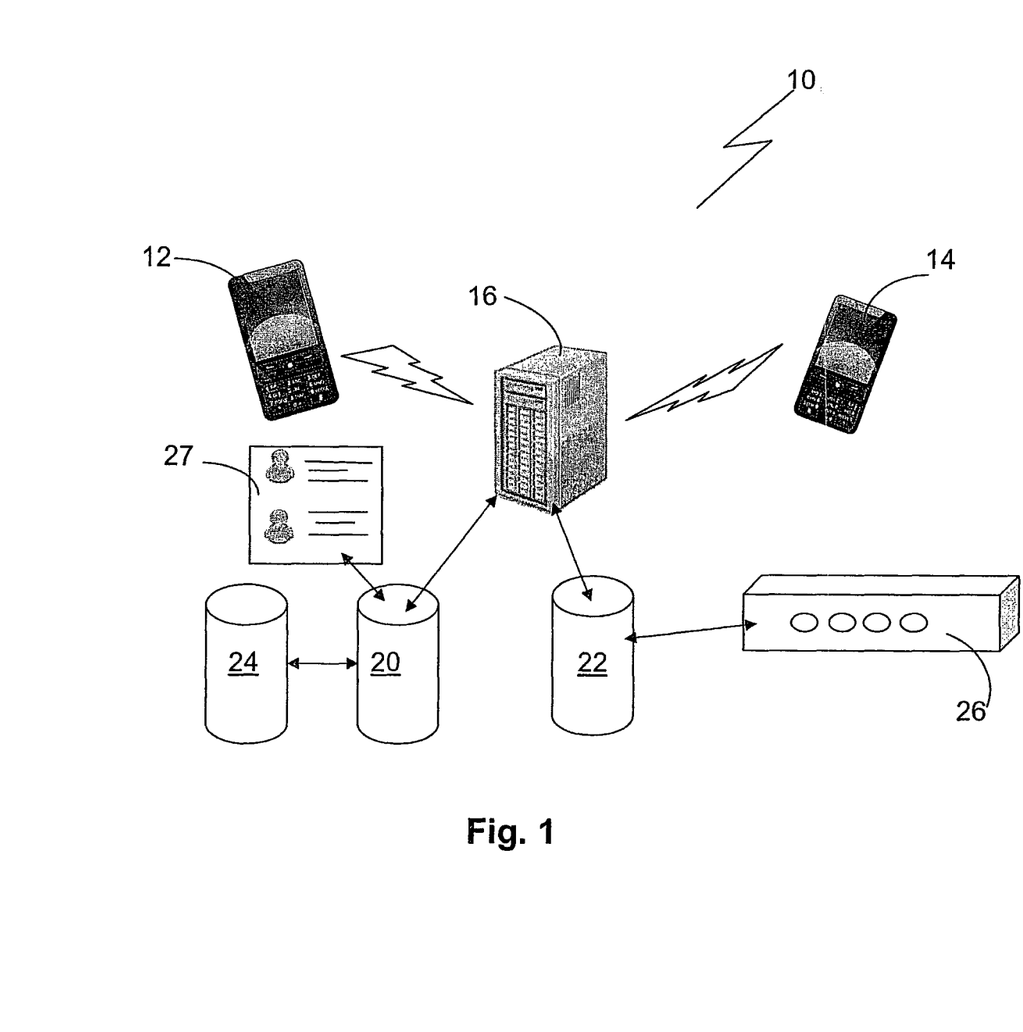
FIG. 1 is a system block diagram in accordance with an embodiment of the invention.

In accordance with an embodiment of the invention, illustrated in FIG. 1, there is a system 10 for displaying an identifier of a source 12 on a recipient device 14. As examples the source 12 and recipient 14 are mobile devices. The identifier of the source 12 may be the mobile phone number allocated to the source 12 or any other numbers or IDs allocated to the source 12 by the system 10.

The system 10 comprises a processing manager 16 adapted to process communications such as phone calls from the source 12 to recipient device 14. The processing manager 16 may be integrated within the source 12 and/or recipient 14, for example the processing manager 16 may include one or both of the mobile devices 12, 14 that are being used.

The system further comprises an association database 20 and a number masking database 22. The association database 20 is typically a number look-up and management database. The association database 20 defines a list of sources associated with the recipient device.

Processing manager 16 is arranged to access the association database 20 to determine if the source 12 is associated with the recipient device 14.

The association database 20 further comprises a number resolution database 24. The number resolution database 24 resolves any dialed number from the source 12 of the call to determine whether it is within the social network of the recipient 14. The number masking database 22 is connected to an external gateway 26 for routing external calls. Any phone number routing out of the system 10 is masked to make it compatible with international standards such as the E.164 ITU-T recommendation.

The association database 20 further maintains a network address book 27 of all subscribers within the system 10. The network address book 27 is linked to the number masking database 22 and the number resolution database 24. The network address book 27 is configured to further establish/update any social links between subscribers within the system 10. This may be achieved by performing regular synchronization between the address book 27 and the subscriber's mobile device local phonebook.

When a call is made from the source 12, a number is dynamically generated from a number range blocked out for the purpose. The dynamic generation of the number may be random within the limits of the number range. The generated number is added to the association database 20. The association database 20 provides a mapping of the original phone number and the dynamically generated (i.e. masked) phone number. The number resolution database 24 is looked up to determine the originator of the call. Such an arrangement ensures that the original phone number from the source 12 of the call is masked and only the service operator is aware of the mapping. The arrangement further allows the recipient device 14 to bar any parties from calling him/her at the point of look-up.

The processing manager 16 may also comprise a client interface which supports mapping, un-mapping and assigning or managing the system.

The source mobile device 12 may be any mobile device as known in the art. The recipient mobile device 14 is adapted to allow the user the option of blocking a source via a blacklist, with the facility for setting up alerts and flags for certain sources, i.e. watchlisting; or the option to sever social network connections. The recipient device 14 is further configured to allow barring of phone calls.

Figure 2:
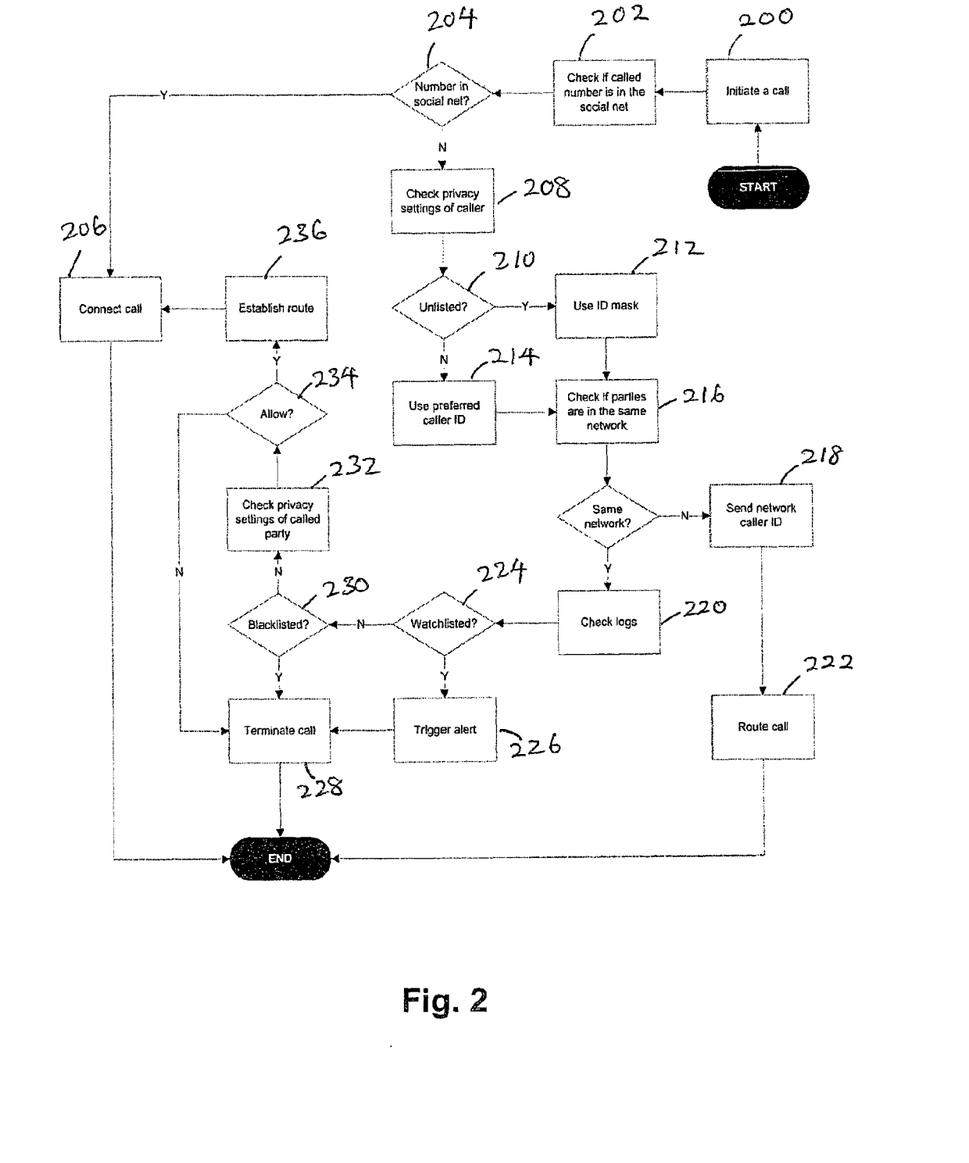
FIG. 2 is a flow diagram illustrating the processing of a phone call to a recipient in accordance with an embodiment of the present invention.

The embodiment is next described in the context of processing a phone call initiated by the source 12 of the call (from herein on interchangeably referred to as caller 12) to a recipient 14 (step 200). As an example the called/dialed number is the source identifier.

The processing manager 16, via the number resolution database 24, checks whether the dialed number is in the social network of the caller 12 (step 202). The check involves comparing the contact list or electronic phone book of both the caller 12 and recipient 14 on the network address book 27 to verify that the caller 12 and recipient 14 are socially connected (step 204). Further verification may include determining whether the caller 12 and recipient 14 had prior communication.

If it is determined that the caller 12 and recipient 14 are socially connected based on step 204, the call is established and connected (step 206). On the other hand, if it is determined that the caller 12 and recipient 14 are not socially connected, it could mean that the caller 12 and recipient 14 had no prior communication or the dialed number has just been added, either by a directory download, a business card forward, or manual input. In such a case, the privacy setting of the caller 12 is checked (step 208). The checking involves determining if the source 12 is unlisted (step 210) or if the privacy setting prevents the caller's number from being revealed. If the caller's number is unlisted, then the number is masked with system assigned information which has at least the indication that the number is masked (step 212). The masked number then becomes the caller's 12 number which will then be displayed on the recipient device 14.

On the other hand, if the privacy settings of the source 12 do not require anonymity, the preferred caller's identity that has been set for the caller 12 is associated with the call (step 214). The preferred identity would then be displayed on the recipient device 14.

Following step 212 or step 214, the system 10 next checks if the caller 12 and recipient 14 are in the same mobile communication network (step 216). If they are not in the same mobile communication network, the call is required to be routed to the external gateway 26 to an external network, which may be an independent network not enabled with the system of the present invention. In such a situation, the call is routed (step 222) with the caller's identification (step 218) associated with the call. The routing involves passing through the external gateway 26 which involves translation of the internal signalling protocol of the system 10 to that which is compatible with the PSTN, ISDN of the external communication network.

If, however, it is established that the caller 12 and recipient 14 are in the same mobile communication network, the system logs are checked (step 220). The system logs could reside in the recipient device 14 or in an external server. The system logs are checked for the following:
  a. whether the caller 12 is in the watch list (step 224), if caller 12 is determined to be in the watch list, an alert or message may be triggered to initiate a call trace or similar options to notify the party which requested for the call trace (step 226). Thereafter, the call is terminated (step 228).
  b. if the caller 12 is determined not to be in the watch list, the system logs are checked if the caller 12 is in the black list (step 230). If so, the caller 12 is blocked and the call is terminated (step 228) immediately. However, if the caller 12 is determined not to be a blacklisted contact, the privacy settings of the recipient device 14 are checked (step 232) to see if anonymous calls or calls from caller 12 outside the recipient's social network is allowed (step 234). If the privacy settings does not allow anonymous calls or calls from outside the recipient's social network, the call is terminated (step 228). On the other hand, if the recipient allows the anonymous call or calls from outside the recipient's social network, a route is established (step 236) and call is connected (step 206).

Figure 3:
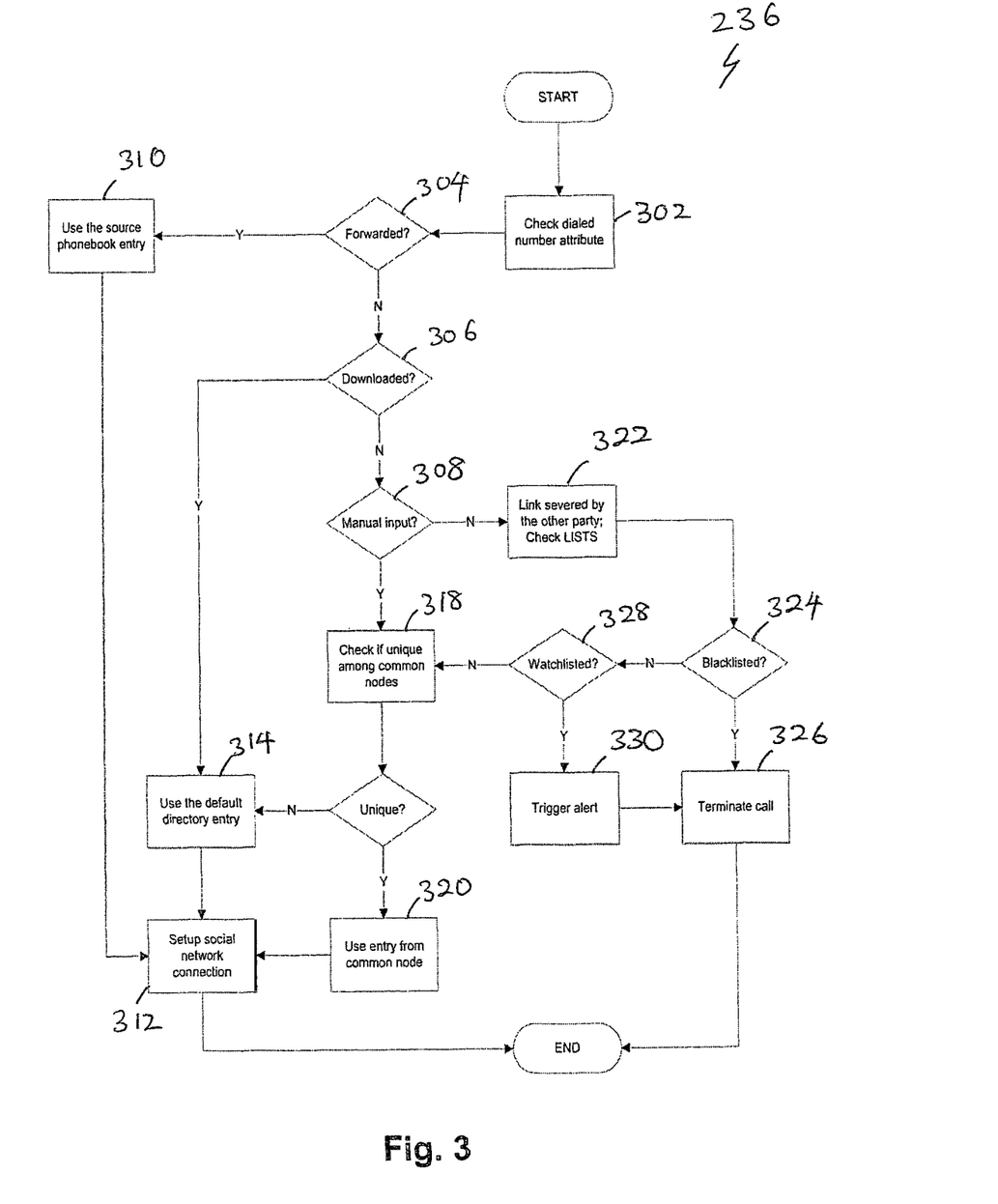
FIG. 3 is a flow diagram illustrating the routing of the phone call to a recipient in accordance with an embodiment of the present invention.

The routing of the call (step 236) is a process which comprises the following steps:

The process begins with a check of the attributes of the dialed number (step 302), which includes checking whether the dialed number is forwarded from a friend (step 304) via for example the sharing of an electronic business card, downloaded (step 306), for example from a central directory service, or manual entry (step 308).

If from step 304 it is determined by the system 10 that the dialed number is forwarded from a friend, the system 10 transmits the shared information from the friend's phonebook entry (step 310) in the network address book 27. Thereafter, the social network between the parties is created (step 312).

If from step 304 it is determined by the system 10 that the dialed number is not forwarded from a friend, the system 10 then checks if the dialed number is downloaded (step 306).

If from step 306 the dialed number is deemed to be downloaded, the default caller identification information entry in the central directory service is used (step 314). Thereafter, the social network between the parties is created (step 312).

If from step 306 it is determined by the system 10 that the dialed number is not downloaded, the system 10 then checks if the dialed number is manually inputted (step 308).

If from step 308 it is determined that the dialed number is manually inputted, the system 10 checks for a common node, i.e. an identified common friend in the network address book 27. The system then verifies if the number dialed is unique among the common nodes (step 318), and if it is, that number and the associated call information is used (step 320). On the other hand, if the dialed number is not unique, i.e. there are duplications of numbers; the system uses the default central directory call information to establish the social network connection (step 314).

If from step 308 it is determined that the dialed number if not manually inputted, the system logically assumes that the data had been resident in the recipient device 14 and thus is a result of a previous social network connection with the recipient 14. Failure to fall into any of the categories checked by steps 304, 306 and 308 indicates that the recipient 14 had severed the social network connection with the caller 12 at some time prior to the call (322). This may be due to one or more of the following reasons:—blacklisting, watchlisting, social withdrawal, or based on mere exigency such as a need to free up space in the electronic phone address book, or even something as mundane as the recipient seeing no perceived need to keep the social connection with the caller, etc.

Figure 4:
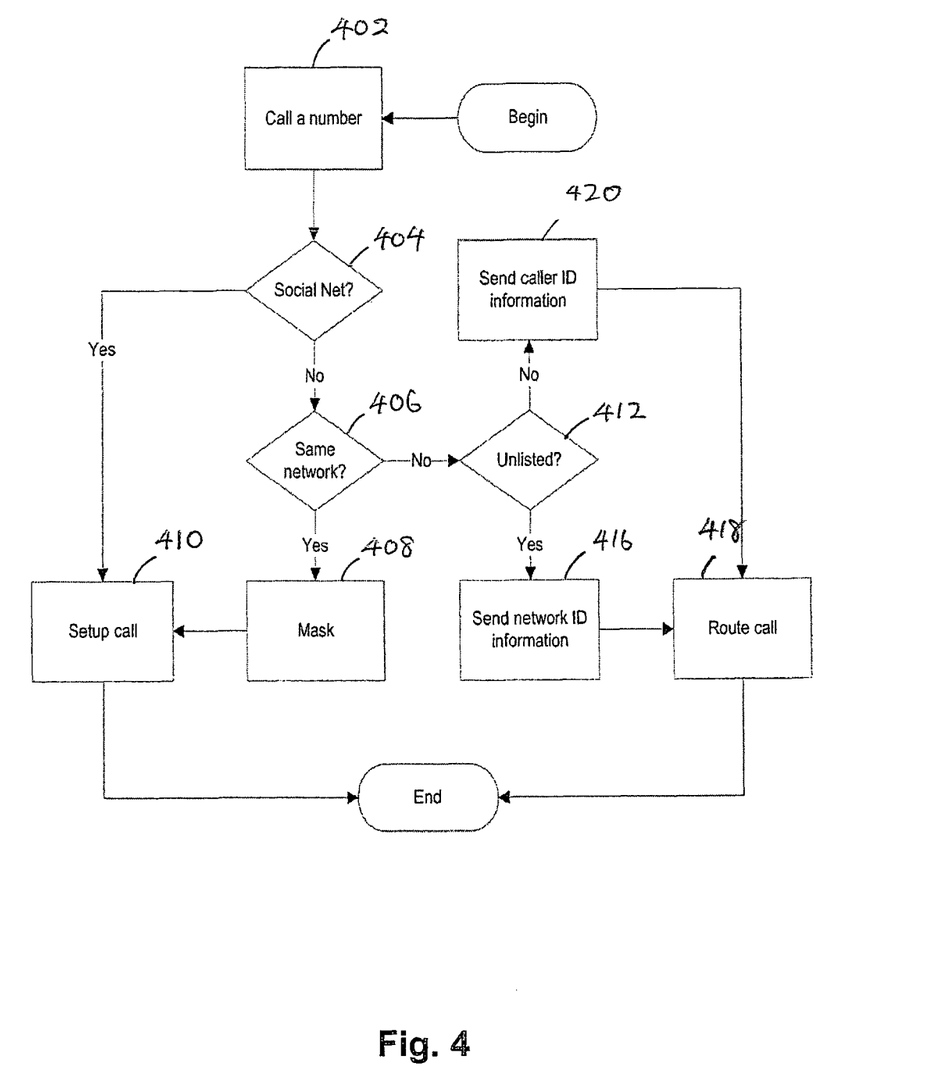
FIG. 4 is a flow diagram illustrating the initiation of a phone call from a source to an intended recipient, the source within the same network employing an embodiment of the present invention

Based on the above logic, the system 10 proceeds to check if the caller 12 has been blacklisted (step 324) or watchlisted (step 328). If it is determined to be blacklisted or watchlisted, the call is terminated (step 326) or an alert is triggered (step 330) thereafter terminating the call respectively.

Where the caller 12 is within the same mobile communication network, the system 10 performs the following, as illustrated in FIG. 4, to establish or route the call.

When such a call is made (step 402), the social network associated with the intended recipient device 14 is checked whether the called number is a node in the social network of the intended recipient 14 (step 404). By default, the call is routed to the identified node in the social network. If the intended recipient 14 number is not in the social network of the source, the phone network is then checked whether the intended recipient 14 is within the same network (step 406). If the intended recipient 14 is within the same network, the phone number of the source 12 is masked (step 408) as specified by the source 12 and the call is connected (step 410).

If the intended recipient 14 is determined to be in a different network, the system 10 checks if the recipient 14 is an unlisted number (step 412), and if the recipient 14 is an unlisted number, the system 10 sends the network ID information (step 416) and routes the call (step 418). If the recipient 14 is not an unlisted number, the caller ID information is sent in-lieu of the network ID information (step 420) and the call is routed (step 418).

It is to be appreciated that even if the caller 12 specifies a mask for his or her number, if he or she has previously connected with the intended recipient 14, the specified mask will be overridden by the information from the previously established connection. As an example, if caller 12 has prior contact (i.e. established a social connection) with recipient 14 where caller 12 used the number n; and caller 12 subsequently severed his or her connection with recipient 14 and then caller 12 tries to re-connect with recipient 14 using another different specified number x, this number x will be overridden by n and recipient 14 will still see caller 12 number as n instead of the new number x. It is to be appreciated that the caller 12 number will be different to another recipient C in social group AC as their social grouping is different.

Figure 5:
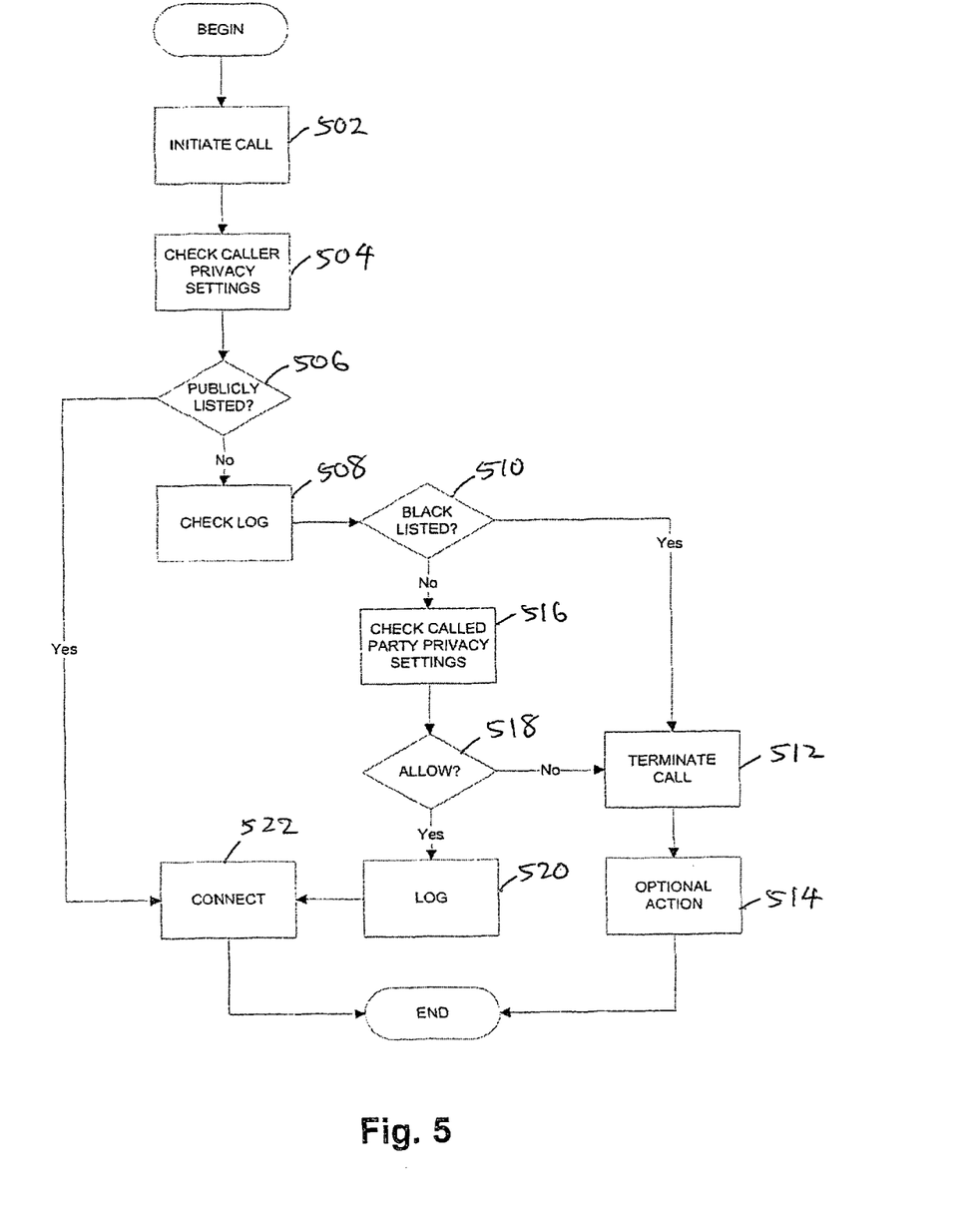
FIG. 5 is a flow diagram illustrating the initiation of a phone call from a source to an intended recipient in a different network.

In the case where the originating caller 12 is from an external network and the recipient device 14 is within the network, the system 10 performs the following, as illustrated in FIG. 5, to establish, terminate or perform any optional action pertaining to the call.

Upon initiating the call (step 502), the privacy setting of the caller 12 is checked (step 504). An example of a way of checking the privacy setting of the caller 12 involves checking if the caller 12 is publicly listed (step 506). If the caller 12 discloses caller identification or is publicly listed, the call is connected (step 522). However, if the caller 12 withholds caller identification, such that it is not publicly listed, the system logs are checked (step 508) to determine if the caller 12 is on the blacklist (step 510). If the number of caller 12 is blacklisted, the call is terminated (step 512) and the system 10 has the option to perform further actions such as initiating a call trace or sending out an alert (step 514) to any nominated emergency contacts or social contacts.

Upon determining that the number of caller 12 is not blacklisted, the privacy setting of the recipient is checked (step 516). The called party 14 is checked and if anonymous calls are accepted (step 518), the call is logged by the system (step 520) and subsequently connected (step 522). On the other hand, if the called party does not accept anonymous calls, the call is terminated immediately (step 512). Again, the system has to option to perform certain further actions, such as initiating a call trace or sending out an alert (step 514).

When a call is logged (step 520), the system 10 pairs the calling number with the called number. This pairing becomes a virtual social network connection such that in a subsequent call from the same caller 12 and in the absence of derogatory information found upon checking of the logs, i.e. being in the blacklist, the call is already connected to the called party. The intended recipient 14, which is inside the network using this invention, has the option, however, at any time, to put the source 12 on a blacklist and disconnect, or sever the social network connection.

Figure 6:
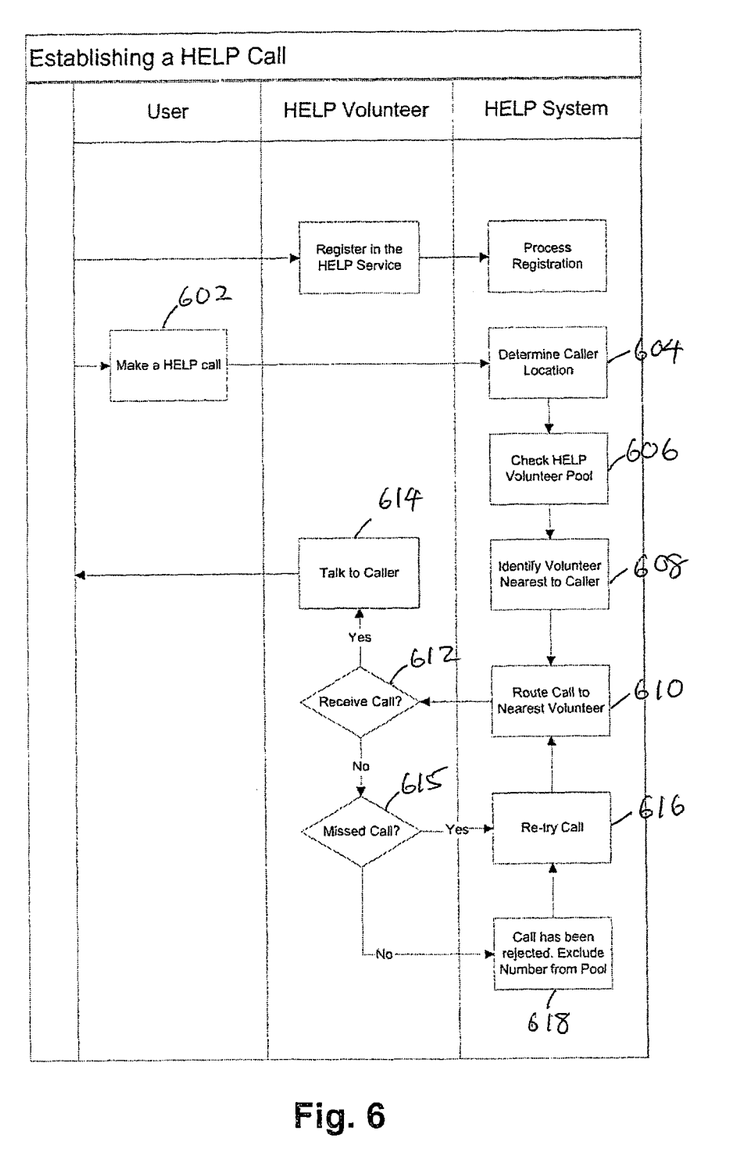
FIG. 6 is a flow diagram illustrating how an embodiment of the present invention may be used as an 'In case of Emergency' tool in conjunction with a Location based service.

The embodiment as described above may also be used in conjunction with a Location Based Service (LBS) in the case of an emergency (ICE) tool. In an illustrative example as depicted in FIG. 6, it is assumed that certain users signed up to volunteer with an Emergency HELP service. The business rules for this can be defined by the organization which oversees the Emergency HELP service's telephone number or HELPline.

The HELPline process is started by an end user in distress. This end user which becomes the caller or source 12 calls the designated HELPline number, which in this example is 4357, corresponding to HELP in a regular phone keypad (step 602). It is to be appreciated that if it were a 911 call, the call would be routed to the 911 call centre. The Emergency help service system then invokes the LBS and determines the location of the source 12 (step 604).

The processing manager 16 proceeds to check its volunteer database (known as a HELP group) and acquires their locations (step 606). In case of a closed HELP group, i.e. the user defines which numbers are to be associated with a HELP call, the system and LBS checks the location of the volunteer pool. The system identifies the volunteer nearest in location to the source 12 (step 608). As the source 12 may be in the company of others who are part of the volunteer pool and the company may be in distress together, if a call for help is routed to them, it would defeat the purpose of the distress call. Hence, the Emergency help service system shall determine that the relative location of the source and the target volunteer are not identical to such degree of within a margin of error associated with the LBS.

Upon determining the nearest volunteer, the system 10 routes the call to the nearest volunteer (step 610). If a volunteer receives the call (step 612), then a conversation is established (step 614).

On the other hand, a volunteer may not receive a call, either because the volunteer failed to notice the call, for example a missed call (step 615), or because the volunteer is not interested to respond to the distress call. If the volunteer inadvertently missed the call, a reattempt to call is made by the system 10 (step 616). On the other hand, if the call is intentionally rejected, the phone number of the rejecting party is removed from the pool of volunteers (step 618). The system then determines who among the others in the pool is nearest the distressed party and tries to route the call to that volunteer, i.e. a retry with excluded party (step 616). The steps 610 to 618 may be repeated as discussed.

In addition, there may be a time out feature wherein if the calls are being routed to the same numbers and calls remain unanswered, the call by default is routed to the central HELPline which could be a facility similar to 911 or to such other implementation as may be adopted by the locality, the mobile network operator, or such other concerned party.

The volunteer database may be user-defined, i.e. defined by the user who is in distress. It could also be system generated, based on an existing directory service, which is a centralized database for all subscribers as well as an online white/yellow page service and a social network roster. It could also be social, based on the entries in the caller's contact list or phone book, or based on the frequency or duration of interaction between the caller and those in his or her contact list, phone book, call or message log file.

The present invention provides a number masking feature that extends the mere hiding or spoofing or a source identifier. Through the processing of the calls as described in the various examples and embodiments above, the number masking feature of the invention is a conscious effort to make phone numbers relevant, or irrelevant, to parties using a secure infrastructure (i.e. within a communication network) that prevents fraud.

Compared to prior art standards such as RFC 3325, which enables a network of trusted servers to assert the identity of authenticated users, where users have to be within the network of trust, the present invention contemplates a situation beyond the definition of RFC 3325, where one party may be outside the trusted network.

An advantage associated with the present invention is that the identifier such as Mobile Identification Number (MIN) is never exposed providing controllable privacy due to checks performed on the privacy settings of both the source and recipient devices.

Further, In light of the social network address book 27 which is maintained within the system's network, number spoofing is not possible from the mobile Caller or recipient as only the operator has knowledge of the identification mapping at all times.

It is to be understood that the above embodiments have been provided only by way of exemplification of this invention, such as those detailed below, and that further modifications and improvements thereto, as would be apparent to persons skilled in the relevant art, are deemed to fall within the broad scope and ambit of the present invention described, in particular:—

- The source device 12 and recipient device 14 could be mobile phones or any electronic gadget or device with network connectivity.
- The caller and recipient device could be in wireless communication via mobile network, i.e. 3G, EDGE, GSM, radio etc.; through wireless networks, i.e. Wi-Fi, WiMax, IrDA, Bluetooth, NFC, or through wired connectivity.
- The invention may be implemented via other interfaces such as an Interactive Voice Response system (IVR) or web site.

Furthermore although individual embodiments of the invention may have been described it is intended that the invention also covers combinations of the embodiments discussed.

The invention claimed is:

1. A system for displaying an identifier of a source on a recipient device in communication with the source, the system comprising:
    an association database maintaining a network address book; and
    a processing manager configured to compare a contact list of the source with a contact list of the recipient device on the network address book in order to determine whether the source is associated with the recipient device when the source initiates a communication to the recipient device,
    wherein if the source is associated with the recipient device, the processing manager controls to display an established identifier of the source on the recipient device, and
    wherein if the source is not associated with the recipient device, the system is operable to determine privacy settings of the recipient device, and if determined privacy settings of the recipient device allow the recipient device to accept a communication from outside the recipient device's social network, the system is operable to determine how an identifier of the recipient device was derived on the source, and establish a route between the source and the recipient device based at least upon information associated with how the identifier of the recipient device was derived on the source.

2. The system according to claim 1, wherein the processing manager is integrated with the source or the recipient device.

3. The system according to claim 1 or 2, wherein the recipient device is a mobile device.

4. The system according to claim 1 or 2, wherein the source is a mobile device.

5. The system according to claim 1 or 2, wherein the processing manager includes a client interface which allows access to the system to manage the system.

6. The system according to claim 1, wherein the system further comprises a Location Based Service (LBS) to determine a location of the source.

7. The system according to claim 6, wherein the LBS is further configured to inform emergency services of a location of the source.

8. The system according to claim 6, wherein the LBS is further configured to inform at least one contact from the source.

9. The system according to claim 8, where the at least one contact is designated by the source in the processing manager.

10. The system according to claim 8, wherein the at least one contact from the source is designated based on frequency of interaction with the source.

11. The system according to claim 8, wherein the at least one contact from the source is designated based on duration of interaction with the source.

12. The system according to claim 6, wherein the LBS is further configured to access a database of registered users and determine the number of registered users of the LBS nearest to the location of the source.

13. The system according to claim 12, wherein the LBS is further configured to inform the number of registered users of the LBS.

14. The system according to 12, wherein the LBS is further configured to inform at least one registered user nearest to the location of the source.

15. The system according to claim 14, wherein the LBS is further configured to inform emergency services of the location of the source.

16. The system according to claim 14, wherein the LBS is further configured to access the network address book and inform at least one registered user not associated with the source.

17. The system according to claim 14, wherein the LBS is further configured to access the database of registered users and update the database accordingly based on an action of the at least one registered user who was informed.

18. The system according to claim 17, wherein the LBS is further configured to access the database of registered users and inform at least one registered user second nearest to the location of the source.

19. The system according to claim 6, wherein, upon determining that the source is watchlisted or blacklisted, the communication initiated by the source is terminated or an alert is triggered thereafter terminating the communication respectively.

20. The system according to claim 1, wherein the recipient device comprises a system log for determining whether the source is watchlisted or blacklisted.

21. The system according to claim 1, wherein the processing manager is adapted to be in a data communication with an external gateway for routing the data communication from the source to the recipient device, if the source and the recipient device are not within a same communication network.

22. The system according to claim 1, wherein the network address book is further configured to determine whether the source is associated with the recipient device by performing regular synchronization among the network address book, the source and the recipient device.

23. The system according to claim 1, wherein, if the source is not associated with the recipient device, the processing manager is operable to determine privacy settings of the source and display another identifier on the recipient device in accordance with determined privacy settings of the source, wherein the privacy settings of the source are determined based on whether the source is publicly listed, unlisted or having a masked identifier.

24. A method for displaying an identifier of a source on a recipient device in communication with the source in a system, comprising:
  initiating, by the source, a communication to the recipient device;
  comparing a contact list of the source with a contact list of the recipient device on a network address book;
  determining whether the source is associated with the recipient device;
  if the source is associated with the recipient device, displaying an established identifier of the source on the recipient device; and
  if the source is not associated with the recipient device, determining, by the system, privacy settings of the recipient device, and if determined privacy settings of the recipient device allow the recipient device to accept a communication from outside the recipient device's social network, determining, by the system, how an identifier of the recipient device was derived on the source, and establishing, by the system, a route between the source and the recipient device based at least upon information associated with how the identifier of the recipient device was derived on the source.

25. The method of claim 24, further comprising: if the source is not associated with the recipient device, determining privacy settings of the source by a processing manager and displaying another identifier on the recipient device based at least upon the privacy settings of the source, wherein determining the privacy settings of the source includes determining whether the source is unlisted or has its identifier masked.

26. The method of claim 24, wherein, if the source and the recipient device are within a same communication network, the method further comprising checking if the source is blacklisted or watchlisted within the same communication network.

27. The method of claim 26, wherein, if the source is not blacklisted and watchlisted, the privacy settings of the recipient device are checked to determine whether the identifier of the source is displayed on the recipient device.

28. The method of claim 26, wherein, if the source is watchlisted, an alert is triggered and the communication from the source to the recipient device is terminated.

29. The method of claim 26, wherein, if the source is blacklisted, the communication from the source to the recipient device is terminated.

30. The method of claim 26 wherein determining how the identifier of the recipient device was derived on the source comprises determining whether the identifier of the recipient device was forwarded, downloaded or manually inputted to the source.

31. The method of claim 24, further comprising determining whether the source and the recipient device are within a same communication network, and routing the communication from the source if the source and the recipient device are not within the same communication network.

32. The method of claim 24, wherein comparing the contact list of the source with the contact list of the recipient device on a network address book includes accessing the network address book.

33. The method of claim 32 wherein the network address book is regularly synchronized with the source and the recipient device.

34. A recipient device comprising a processing manager configured to process a communication from a source to the recipient device in a system;
  the processing manager configured to access an association database maintaining a network address book, and to compare a contact list of the source with a contact list of the recipient device on the network address book in order to determine whether the source is associated with the recipient device when the source initiates a communication to the recipient device;
  wherein if the source is associated with the recipient device, the recipient device displays an established identifier of the source, and
  wherein if the source is not associated with the recipient device, the system is operable to determine privacy settings of the recipient device, and if determined privacy settings of the recipient device allow the recipient device to accept a communication from outside the recipient device's social network, the system is operable to determine how an identifier of the recipient device was derived on the source, and establish a route between the source and the recipient device based at least upon information associated with how the identifier of the recipient device was derived on the source.

* * * * *